US012587464B2

(12) United States Patent
Ray

(10) Patent No.: US 12,587,464 B2
(45) Date of Patent: Mar. 24, 2026

(54) FAULT INJECTION CONFIGURATION EQUIVALENCY TESTING

(71) Applicant: International Business Machines Corporation, Armonk, NY (US)

(72) Inventor: Kaustabha Ray, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 18/582,409

(22) Filed: Feb. 20, 2024

(65) Prior Publication Data

US 2025/0267089 A1     Aug. 21, 2025

(51) Int. Cl.
*H04L 43/50* (2022.01)
*H04L 43/062* (2022.01)
*H04L 43/0817* (2022.01)

(52) U.S. Cl.
CPC ............ *H04L 43/50* (2013.01); *H04L 43/062* (2013.01); *H04L 43/0817* (2013.01)

(58) Field of Classification Search
CPC ... H04L 43/50; H04L 43/062; H04L 43/0817; H04L 43/00; H04L 43/06; H04L 43/08; H04L 43/0805; H04L 43/0823; H04L 43/0852; H04L 43/0876; H04L 43/091; H04L 43/0811; H04L 43/0829; H04L 43/0847; H04L 43/0894; H04L 43/0888;
(Continued)

(56) References Cited

U.S. PATENT DOCUMENTS

| | | | | |
|---|---|---|---|---|
| 9,842,045 B2 * | 12/2017 | Heorhiadi | ........... | G06F 11/3692 |
| 2013/0051229 A1 * | 2/2013 | Rabie | ..................... | H04L 47/15 |
| | | | | 370/230 |

(Continued)

FOREIGN PATENT DOCUMENTS

| | | | | |
|---|---|---|---|---|
| CN | 109495297 A | | 3/2019 | |
| CN | 116450489 A | * | 7/2023 | ......... G06F 11/3698 |
| WO | 2022120959 A1 | | 6/2022 | |

OTHER PUBLICATIONS

Zhang et al., "Efficient Dynamic Deployment of Simulation Tasks in Collaborative Cloud and Edge Environments," Applied Sciences, vol. 12, 2022, pp. 1-20.

(Continued)

*Primary Examiner* — Rachel J Hackenberg
(74) *Attorney, Agent, or Firm* — Zilka-Kotab, P.C.

(57) ABSTRACT
A computer-implemented method, according to one embodiment, includes causing a first fault injection configuration to be injected into a first node of a first edge site of a cloud environment, where the first edge site includes a plurality of nodes, and the cloud environment includes a second edge site. The method further includes computing a first minimum cost maximum flow value for the first fault injection configuration, and causing a second fault injection configuration to be injected into a second node of the second edge site for causing a second fault injection. A second minimum cost maximum flow value is computed for the second fault injection configuration. In response to a determination that a difference of the minimum cost maximum flow values is less than a predetermined threshold, one of the fault injection configurations is retained and the other fault injection configuration is discarded.

20 Claims, 9 Drawing Sheets

(58) Field of Classification Search
CPC .............. H04L 43/0882; H04L 43/087; H04L
43/0864; H04L 43/0858; H04L 43/14;
H04L 43/16
See application file for complete search history.

(56) References Cited

U.S. PATENT DOCUMENTS

| | | | | |
|---|---|---|---|---|
| 2015/0161025 A1* | 6/2015 | Baset | ................. | G06F 11/2028 714/38.1 |
| 2016/0371134 A1* | 12/2016 | Raghavendra | ........ | G06F 11/079 |
| 2018/0285239 A1* | 10/2018 | Papak | ................. | G06F 11/3644 |
| 2019/0044790 A1* | 2/2019 | Dickens | ................. | H04L 43/50 |
| 2023/0188409 A1* | 6/2023 | Wang | ................. | G06F 11/0754 709/224 |
| 2024/0430170 A1* | 12/2024 | Viccari | ................. | H04L 41/145 |

OTHER PUBLICATIONS

Gotlieb et al., "Flower: Optimal Test Suite Reduction as a Network Maximum Flow," ISSTA, Jul. 2014, pp. 171-180.

Meiklejohn, C., "Dynamic Reduction: Optimizing Service-level Fault Injection Testing With Service Encapsulation," christophermeiklejohn.com, Oct. 14, 2021, 10 pages, retrieved from https://christophermeiklejohn.com/filibuster/2021/10/14/filibuster-4.html.

Chen et al., "Maximum Flow and Minimum-Cost Flow in Almost-Linear Time," arXiv, 2022, 112 pages, retrieved from https://arxiv.org/abs/2203.00671.

Barbosa, R., "Fault Injection Optimization through Assembly-Level Pre-Injection Analysis," Master's Thesis, Chalmers University of Technology, 2004, 64 pages.

Fahs et al., "Proximity-Aware Traffic Routing in Distributed Fog Computing Platforms," 19th IEEE/ACM International Symposium on Cluster, Cloud and Grid Computing (CCGrid), 2019, 11 pages.

Aral et al., "Dependency Mining for Service Resilience at the Edge," IEEE/ACM Symposium on Edge Computing (SEC), 2018, 16 pages.

* cited by examiner

100

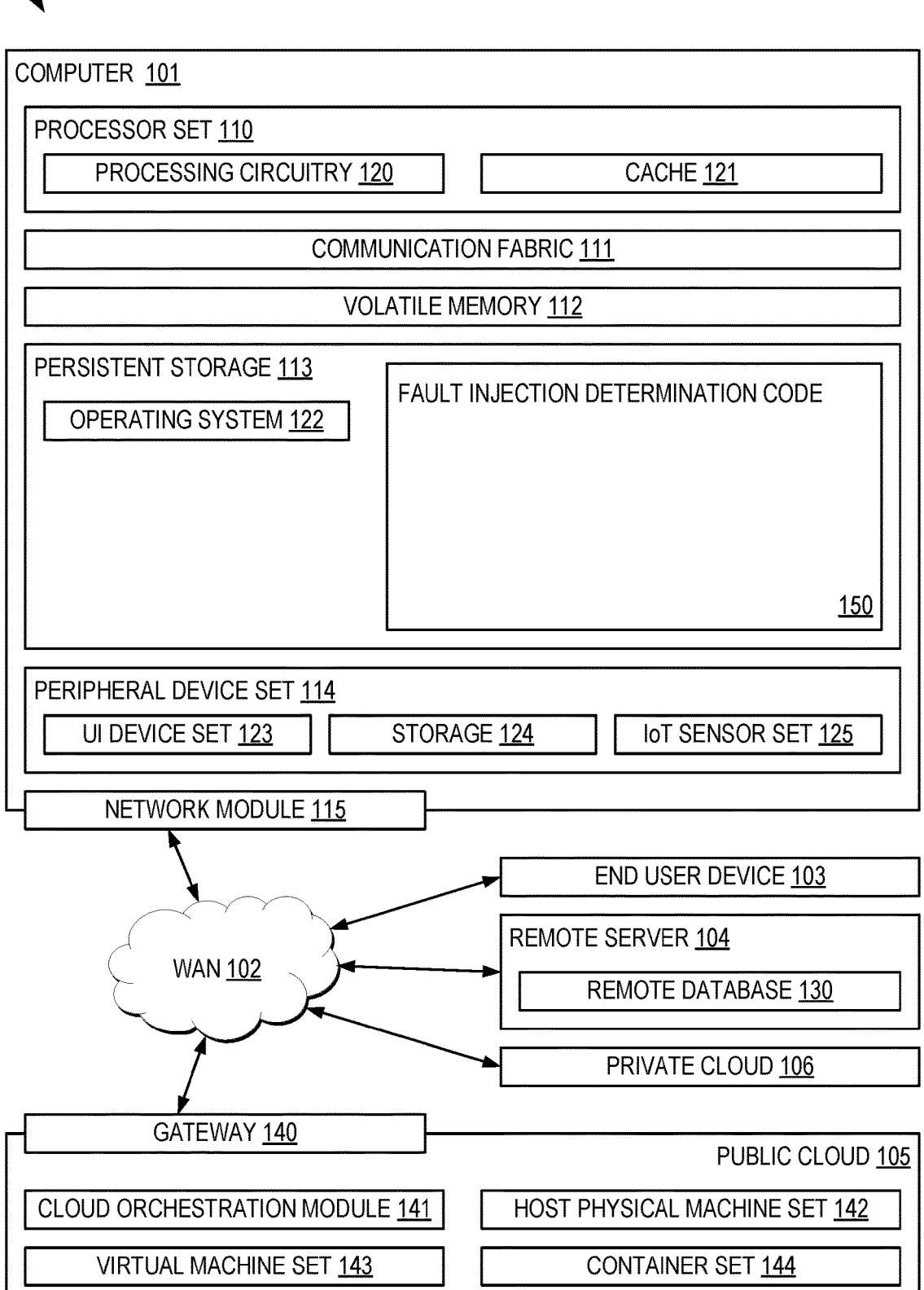

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

FAULT INJECTION DETERMINATION CODE

150

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

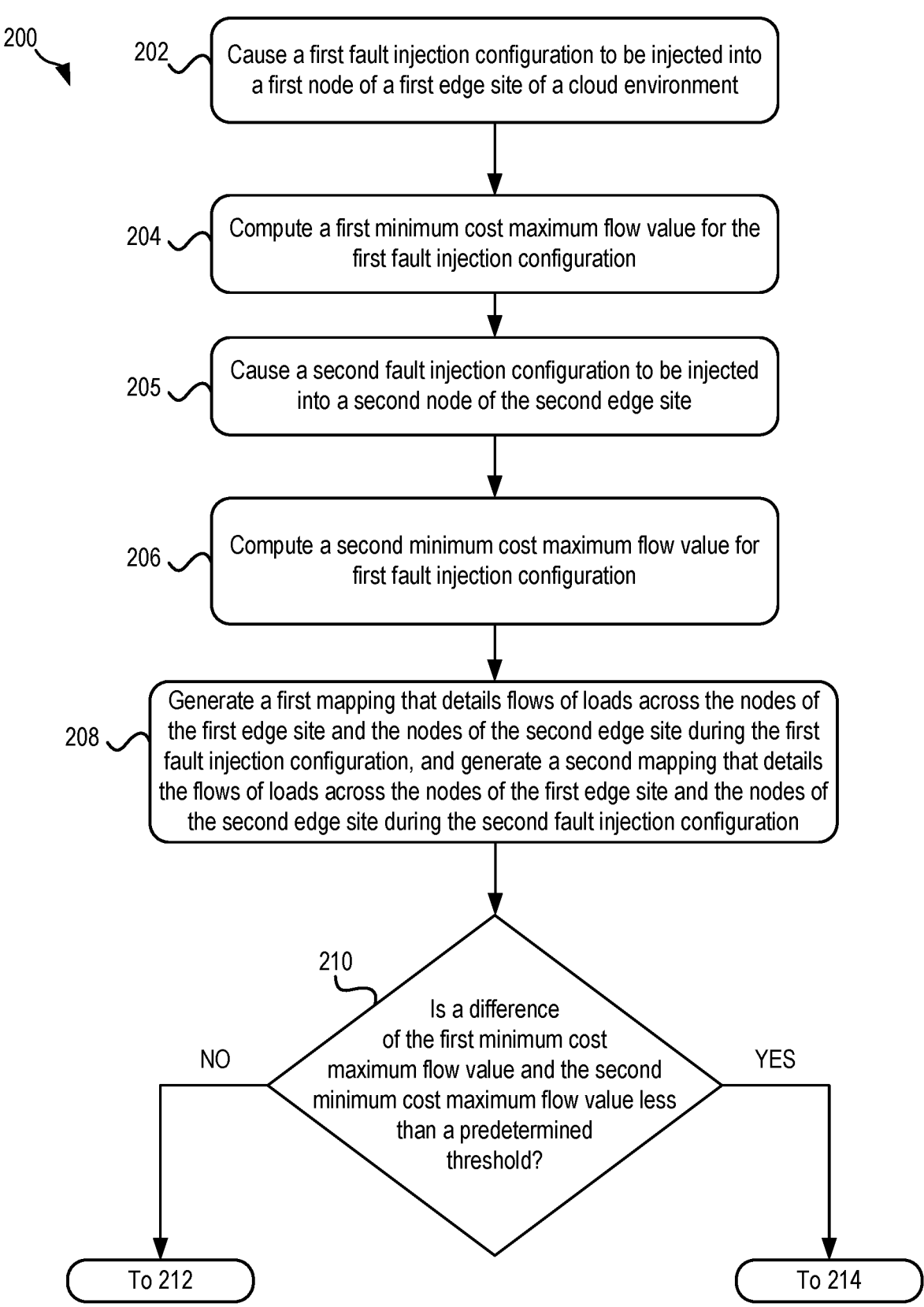

200

202 Cause a first fault injection configuration to be injected into a first node of a first edge site of a cloud environment 204 Compute a first minimum cost maximum flow value for the first fault injection configuration 205 Cause a second fault injection configuration to be injected into a second node of the second edge site 206 Compute a second minimum cost maximum flow value for first fault injection configuration 208 Generate a first mapping that details flows of loads across the nodes of the first edge site and the nodes of the second edge site during the first fault injection configuration, and generate a second mapping that details the flows of loads across the nodes of the first edge site and the nodes of the second edge site during the second fault injection configuration 210 Is a difference of the first minimum cost maximum flow value and the second minimum cost maximum flow value less than a predetermined threshold?

NO

YES

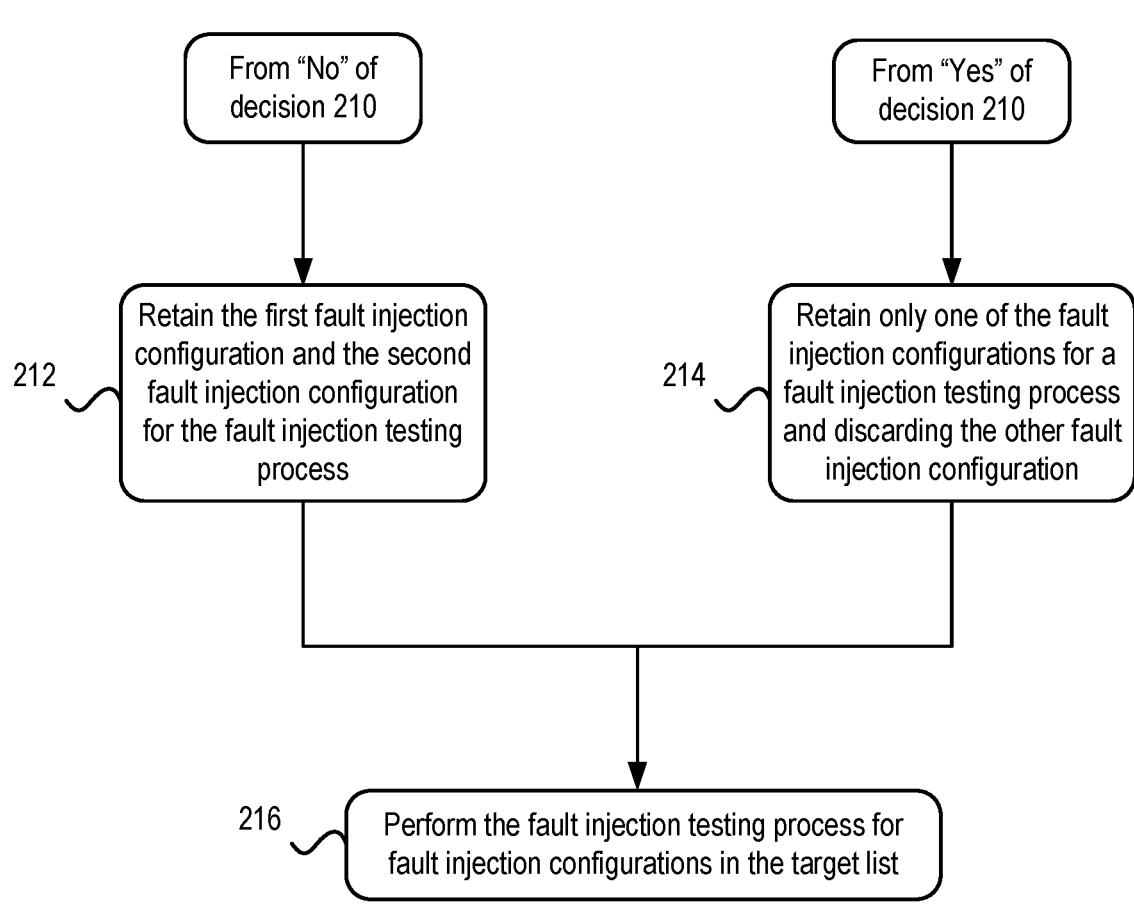
FIG. 2
(continued)

FAULT INJECTION CONFIGURATION EQUIVALENCY TESTING

BACKGROUND

The present invention relates to cloud environments, and more specifically, this invention relates to edge sites in a cloud environment.

A plurality of edge sites may exist within a cloud based environment, e.g., a multi-cloud edge environment. Each of these edge sites may include a plurality of edge nodes, which may be user devices, servers, etc., within the edge sites. Services are typically deployed on edge nodes that are servers, and resources of the edge sites may be allocated to services in order to fulfill requests received by the edge sites. During this fulfillment, an associated performance load, e.g., an input/output (I/O) workload, is typically distributed across at least some of the edge nodes of the cloud based environment via load balancing.

SUMMARY

A computer-implemented method (CIM), according to one embodiment, includes causing a first fault injection configuration to be injected into a first node of a first edge site of a cloud environment, where the first edge site includes a plurality of nodes including the first node, and the cloud environment includes a second edge site. The method further includes computing a first minimum cost maximum flow value for the first fault injection configuration, and causing a second fault injection configuration to be injected into a second node of the second edge site for causing a second fault injection. A second minimum cost maximum flow value is computed for the second fault injection configuration. In response to a determination that a difference of the first minimum cost maximum flow value and the second minimum cost maximum flow value is less than a predetermined threshold, one of the fault injection configurations is retained for a fault injection testing process and the other fault injection configuration is discarded.

A computer program product (CPP), according to another embodiment, includes a set of one or more computer-readable storage media, and program instructions, collectively stored in the set of one or more storage media, for causing a processor set to perform the forgoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

DETAILED DESCRIPTION

Figure 3A:
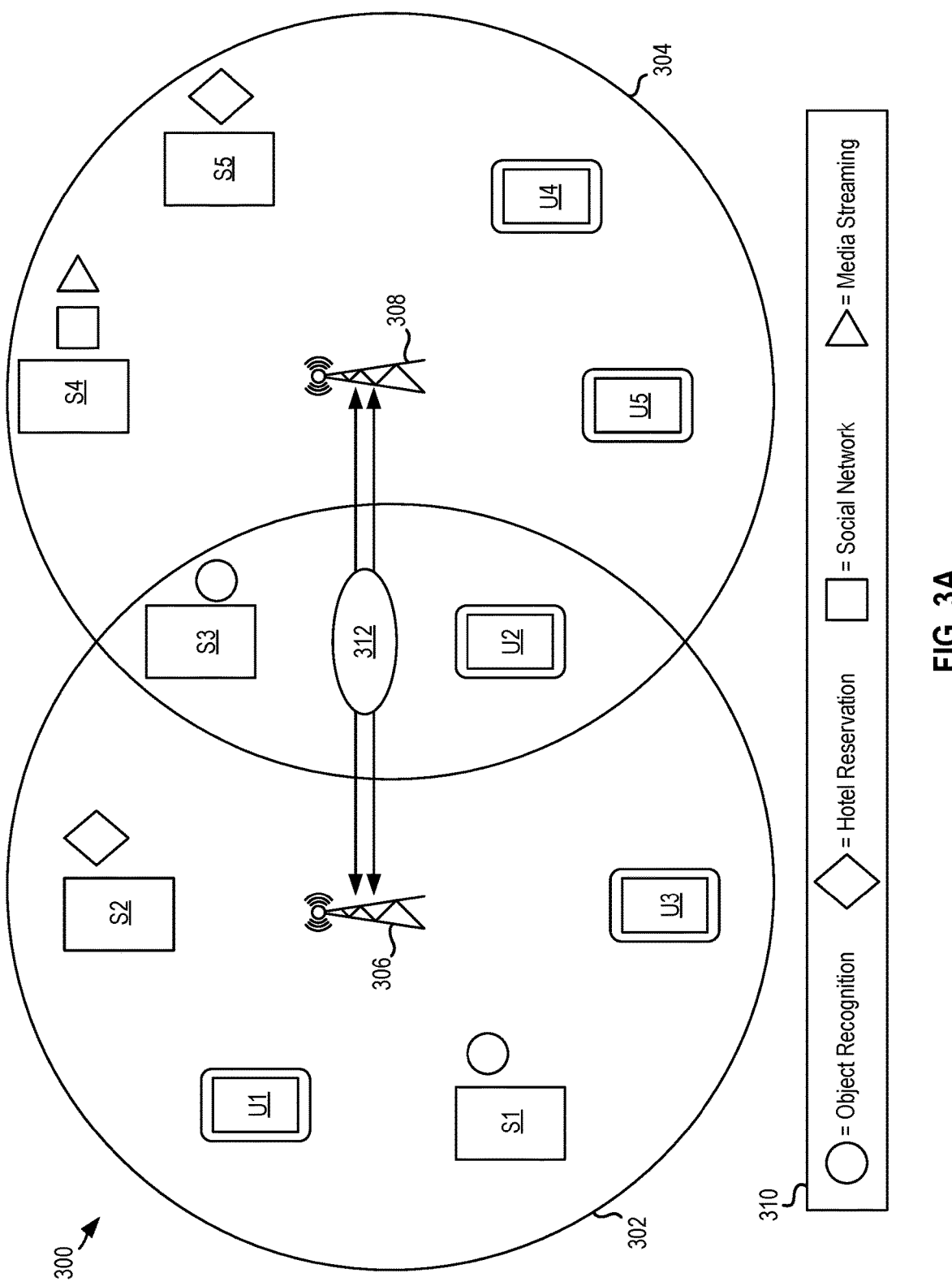
FIGS. 3A-3D are a multi-cloud edge environment, in accordance with several embodiments.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for refining the extent of fault injection configurations that are tested during a fault injection testing process.

In one general embodiment, a CIM includes causing a first fault injection configuration to be injected into a first node of a first edge site of a cloud environment, where the first edge site includes a plurality of nodes including the first node, and the cloud environment includes a second edge site. The method further includes computing a first minimum cost maximum flow value for the first fault injection configuration, and causing a second fault injection configuration to be injected into a second node of the second edge site for causing a second fault injection. A second minimum cost maximum flow value is computed for the second fault injection configuration. In response to a determination that a difference of the first minimum cost maximum flow value and the second minimum cost maximum flow value is less than a predetermined threshold, one of the fault injection configurations is retained for a fault injection testing process and the other fault injection configuration is discarded.

In another general embodiment, a CPP includes a set of one or more computer-readable storage media, and program instructions, collectively stored in the set of one or more storage media, for causing a processor set to perform the forgoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as fault injection determination code of block 150 for refining the extent of fault injection configurations that are tested during a fault injection testing process. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, a plurality of edge sites may exist within a cloud based environment, e.g., a multi-cloud edge environment. Each of these edge sites may include a plurality of edge nodes, which may be user devices, servers, etc., within the edge sites. Services are typically deployed on edge nodes that are servers, and resources of the edge sites may be allocated to services in order to fulfill requests received by the edge sites. During this fulfillment, an associated performance load, e.g., an input/output (I/O) workload, is typically distributed across at least some of the edge nodes of the cloud based environment via load balancing.

Fault events may occur during the normal operation of edge nodes of edge sites in a cloud based environment. These fault events may include one or more edge nodes losing functionality. In order for the edge sites to remain functional, one or more alternative edge nodes may be relied on perform tasks, e.g., I/O operations, that the non-functional edge node(s) would have otherwise performed. Fault testing may be performed to determine configurations of edge nodes to rely on in the event that one or more fault events occur within the edge sites. Techniques of embodiments and approaches described herein refine the extent of fault injection configurations that are tested during a fault injection testing process in order to preserve processing resources in cloud based environments.

Now referring to FIG. 2, a flowchart of a method 200 is shown according to one embodiment. The method 200 may be performed in accordance with the present invention in any of the environments depicted in FIGS. 1-5, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in a cloud environment that includes at least one edge site, and preferably a plurality of cloud sites, e.g., a first edge site, a second edge site, a third edge site, etc. Furthermore, although various approaches described herein describe operations of method 200 with respect to a first edge site and a second edge site, depending on the approach, method 200 may be performed with respect to any number of edge sites, e.g., one edge site, three edge sites, ten edge sites, etc. Furthermore, each of the edge sites includes at least one edge node, and preferably includes a plurality of edge nodes. In some approaches, edge nodes that are user devices are able to access server(s) of at least one edge site while the user devices incur only relatively low latency, e.g., via wireless connections established by wireless cloud network signal infrastructure.

Operation 202 includes causing a first fault injection configuration to be injected into a first node of a first edge site of a cloud environment for causing the first fault injection configuration. The first edge site preferably includes a plurality of nodes including the first node. Furthermore, the cloud environment preferably includes a second edge site having a plurality of edge nodes. In some preferred approaches, the edge nodes of the first edge site and the edge nodes of the second edge site are servers and/or user devices, although in some other approaches, one or more of the edge nodes may be of a type that would become apparent to one of ordinary skill in the art after reading the descriptions herein.

Injection of the first fault injection configuration into the first node of the first edge site may be performed using a technique that would become apparent to one of ordinary skill in the art after reading the descriptions herein. More specifically, injection of a fault into a node described herein may include causing, e.g., instructing, scheduling, etc., the node to fail to a non-functional state and/or be masked from a remainder of the cloud environment, at least temporarily. In some approaches, this temporary period is selectively set based on a predetermined process. For example, in some preferred approaches, the first node is caused to fail for at least a period of time that fault testing is performed on the cloud environment (note that such fault testing will be described in greater detail elsewhere herein).

A first minimum cost maximum flow value is computed for the first fault injection configuration and the second fault injection configuration, e.g., see operation 204. Techniques for computing a minimum cost maximum flow value of a type that would become apparent to one of ordinary skill in the art after reading the descriptions herein may be used. For context, a node remaining functional (during a fault injection configuration in which one or more nodes of the edge sites are intentionally failed) may be defined as the node being able to process a load and, in some approaches, pass some load to another node, during the fault injection configuration. Furthermore, first minimum cost maximum flow value may be defined as a value that is indicative of a relatively lowest cost flow of a relatively highest computational load throughout nodes that remain functional during the existence of a fault injection configuration. For example, this flow may be based on a functional second edge node of the first edge site taking on a first portion of a first computational flow during the existence of a fault injection configuration and a first edge node of the second edge site taking on a second portion of the first computational flow during the existence of the fault injection configuration, where a sum of the portions of the first computational flow is relatively greater than computational loads performed by other combinations of nodes of the edge sites. Furthermore, a cost of the portions of the first computational flow being performed by the second edge node of the first edge site and the first edge node of the second edge site is less than the cost of other node combinations performing the portions of the computational flow. Various formulas that may be used to one or more minimum cost maximum flow values are described below.

Within the cloud environment, for a given edge site, a first formula, e.g., see Formula (1), may be used to compute variable "F" which is an application load (total amount of data) that is processed by an edge site at a specific point in time.

$$F = a(t)/q(t) \qquad \text{Formula (1)}$$

In Formula (1), the variable "a(t)" represents the number of bytes that are generated by an edge site, and the variable "q(t)" represents the queue size, and t denotes the given time point. A load balancer (LB) within a given edge site distributes a load, e.g., a computational load, a workload, etc., between the functional edge nodes of the given edge site according to a predefined policy, e.g., equal load balancing, proximity aware load balancing, etc. For the given edge site, a second formula, e.g., see Formula (2), may be used to represent the processing that occurs at a given edge site.

$$LB = [a(t) + q(t)]/S(t) \qquad \text{Formula (2)}$$

In Formula (2), the variable "a (t)" represents the number of bytes that are generated by an edge site, the variable "q(t)" represents the queue size, and t denotes the given time point and "S (t)" is the processing capacity of the given edge site. In a third formula, e.g., see Formula (3) below, "q(t+1)" represents a size of queue at time t+1 within an edge site. It may be noted that the variable "Rout" is the load that is routed from a considered edge site to another edge site, and a formula that defines the variable "Rout" is included elsewhere below, e.g., see Formula (4).

$$q(t+1) = [a(t) + q(t)] - Rout - LB \qquad \text{Formula (3)}$$

$$R_{out} = \frac{[a(t) + q(t)] - [[a(t) + q(t)]/S(t)]}{B_{uplinkbackbone}} \qquad \text{Formula (4)}$$

In Formula (4), the variable "$B_{uplinkbackbone}$" represents a bandwidth of the edge site being considered. Accordingly, in some approaches, the minimum cost maximum flow value for nodes of one or more edge sites may, in some approaches, be a sum of the computations of Formula (3), where the number of computations that are performed depends on the number of edge sites that are being considered. Note that, in some approaches, the number of edge sites that are being considered may be based on the flows of loads across the nodes in the cloud environment, e.g., some flows may consider only the first edge site, some flows may hop from an edge node of the first edge site to an edge node of the second edge site, etc.

It should be noted that the minimum cost maximum flow values described herein may be computed with respect to a predetermined metric. In order to compare more than one of the computed minimum cost maximum flow values described herein, each of the minimum cost maximum flow values of the comparison are preferably computed with respect to the same type of predetermined metric. In some approaches, the predetermined metric include energy consumed by the nodes that remain functional in edge sites of the cloud environment. In some other approaches, the predetermined metric includes latency. In some other approaches, the predetermined metric includes a load on the nodes that remain functional.

Operation 205 includes causing a second fault injection configuration to be injected into a second node of the second edge site for causing the second fault injection configuration. In other words, one or more additional fault injection configurations are generated in order to compare with other fault injection configurations, e.g., the first fault injection configuration. It should be noted that although various operations of method 200 are described with respect to a first fault injection configuration and a second fault injection configuration, a plurality of additional fault injection configuration may be generated by injecting faults into nodes of the edge sites, e.g., the first edge site, the second edge site, a third edge site, etc.

Operation 206 includes computing a second minimum cost maximum flow value for the second fault injection configuration. In some approaches, the flow of the second minimum cost maximum flow value is based on nodes of the first edge site and the second edge site that remain operational during the second fault injection configuration. For context, these nodes may be able to process a load and/or route a portion of a load to other nodes during the second fault injection configuration. Similar techniques to those described elsewhere herein for computing the first minimum cost maximum flow value may be used to compute the second minimum cost maximum flow value.

In some optional approaches, method 200 includes generating mappings which may be used to perform one or more of the computations described above. For example, a first mapping may be generated that details flows of loads across the nodes of the first edge site and the nodes of the second edge site during the first fault injection configuration, e.g., see operation 208. A second mapping may additionally and/or alternatively be generated that details the flows of loads across the nodes of the first edge site and the nodes of the second edge site during the second fault injection configuration, e.g., see operation 208. In some approaches, representations of nodes of the first edge site within the first mapping that have a flow that traverses to a sink of the first mapping indicate the nodes of the first edge site that do not route load to nodes of the second edge site, e.g., a node that routes to a sink with no other node therebetween is not a route load balancing node. In contrast, representations of nodes of the first edge site within the first mapping that have a flow that does not traverse to the sink of the first mapping but instead first traverses to another of the node representations in the first mapping indicate the nodes of the first edge site that route load to nodes of the second edge site, e.g., a route load balancing node. In these mappings, the head of the flows may be a source which may be the node that a fault is injected into, e.g., a non-functional node that does not assume any computational load during the fault injection configuration. Furthermore, the sink is a reference point that is not a node but is used to graphically indicate the end of flows, and where the sink does not assume any computational load during the fault injection configuration. Illustrative mappings are described in further detail elsewhere herein, e.g., see FIG. 4.

Computed minimum cost maximum flow values may be compared to determine whether the minimum cost maximum flow values should be considered equivalent. For example, decision 210 includes determining whether a difference of the first minimum cost maximum flow value and the second minimum cost maximum flow value is less than a predetermined threshold. In response to a determination that a difference of the first minimum cost maximum flow value and the second minimum cost maximum flow value is less than a predetermined threshold, e.g., as illustrated by the "YES" logical path of decision 210, only one of the fault injection configurations are retained for a fault injection testing process and the other fault injection configuration is discarded, e.g., see operation 214. For context, in response to a determination that the difference of the first minimum cost maximum flow value and the second minimum cost maximum flow value is less than a predetermined threshold, the first fault injection configuration and the second fault injection configuration may be determined to be equivalent. Accordingly, only one of the fault injection configurations is preserved, because otherwise performing a fault injection testing process on both of the fault injection configurations would result in testing duplicity. In other words, equivalent fault injection configurations may be defined as two or more fault injection configurations that yield about the same results, e.g., within 5%, when tested in a fault injection testing process. Accordingly, the techniques described herein may be used to relatively reduce the amount of computational operations that are performed in order to perform a fault injection testing process in a cloud environment.

In contrast to the determination above, in response to a determination that the difference of the first minimum cost maximum flow value and the second minimum cost maximum flow value is greater than or equal to the predetermined threshold, e.g., as illustrated by the "NO" logical path of decision 210, method 200 includes retaining the first fault injection configuration and the second fault injection configuration for the fault injection testing process, e.g., see operation 212. In other words, the first fault injection configuration and the second fault injection configuration may be determined to not be equivalent, and therefore both of the fault injection configurations are retained for incorporation into the fault injection testing process.

In one or more approaches, retaining one of the fault injection configurations for the fault injection testing process and discarding the other fault injection configuration includes adding the retained fault injection configuration to a target list for the fault injection testing process. In contrast, retaining both of the fault injection configurations for the fault injection testing process includes adding the both of the retained fault injection configurations to the target list for the fault injection testing process. Operation 216 includes performing the fault injection testing process for fault injection configurations in the target list. Note that the fault injection testing process is not performed for fault injection configurations discarded and thereby excluded from the target list. For context, the fault injection testing process may be a testing process that would become apparent to one of ordinary skill in the art after reading the descriptions herein. In some approaches, the fault injection testing process includes causing further fault injections within the edge sites and examining and testing recovery and workaround procedures that may thereafter be relied on during operation of the cloud environment.

FIGS. 3A-3D depict a multi-cloud edge environment 300, in accordance with several embodiments. As an option, the present multi-cloud edge environment 300 may be implemented in conjunction with features from any other embodiment listed herein, such as those described with reference to the other FIGS. Of course, however, such multi-cloud edge environment 300 and others presented herein may be used in various applications and/or in permutations which may or may not be specifically described in the illustrative embodiments listed herein. Further, the multi-cloud edge environment 300 presented herein may be used in any desired environment.

Referring first to FIG. 3A, the multi-cloud edge environment 300 includes multiple cloud edge sites, e.g., see first edge site 302 and second edge site 304. Each of the edge sites include user devices, e.g., user edge devices. For example, the first edge site 302 includes a first user device U1, a second user device U2, and a third user device U3. Similarly, the second edge site includes the second user device U2, the fourth user device U4 and the fifth user device U5. The user devices are able to access server(s) of at least one edge site while the user devices incur only relatively low latency, e.g., via wireless connections established by wireless cloud network signal infrastructure, e.g., see wireless cloud network signal infrastructure 306 and 308.

Service request placement with respect to the different edge sites in the multi-cloud edge environment may be performed by a scheduler to determine where to route service requests of the user device. For context, this routing of service requests to a determined server is performed in order for the service request to be fulfilled using resources that are available to the servers and called for in the service request. For example, the resource table 310 includes indications of such resources, and the resource table 310 is shown distributed next to some of the servers of the edge sites. In some use cases, this routing of service requests may be performed across different edge sites, e.g., using a backbone link 312.

Figure 3B:
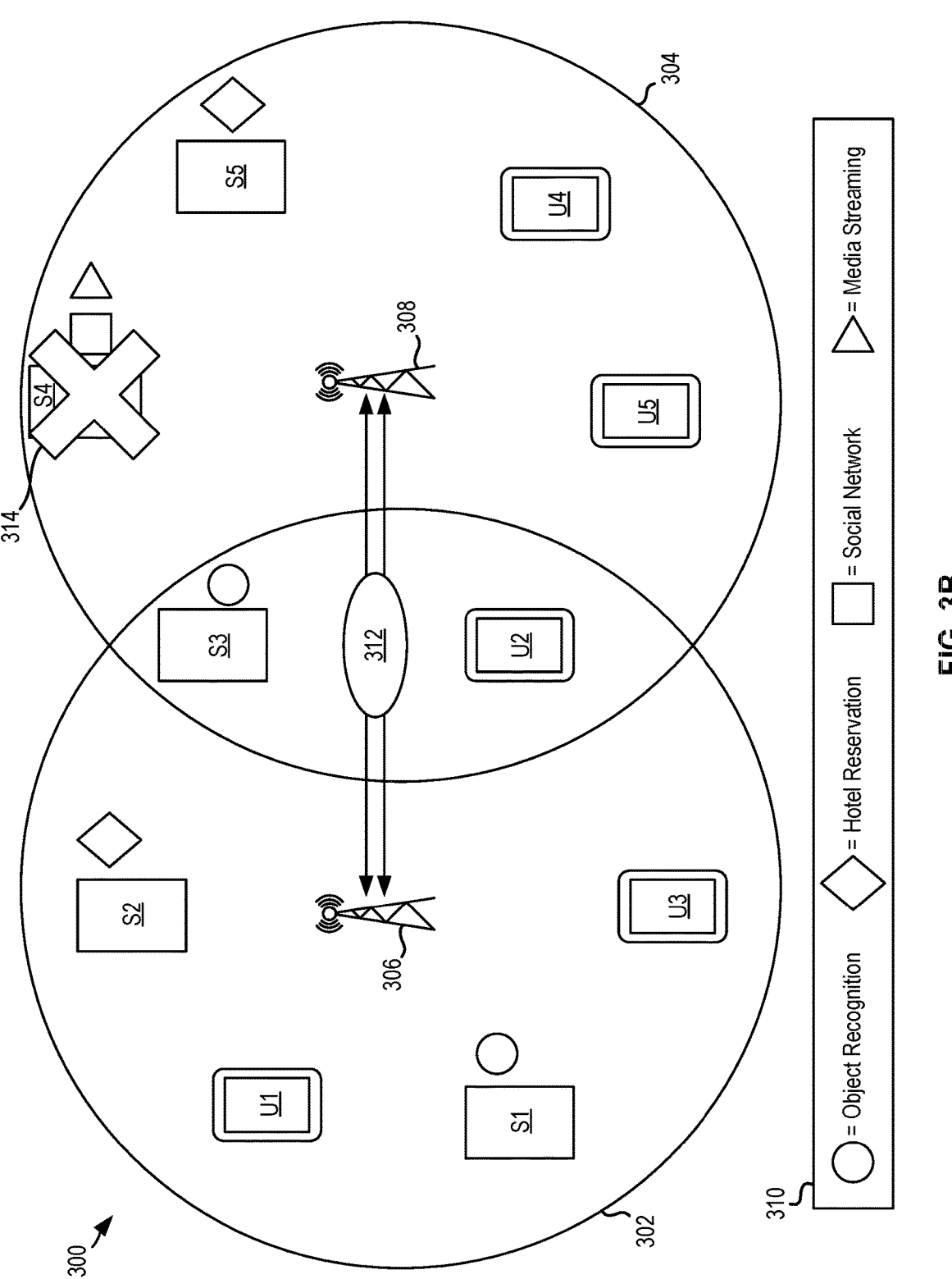
Figure 3C:
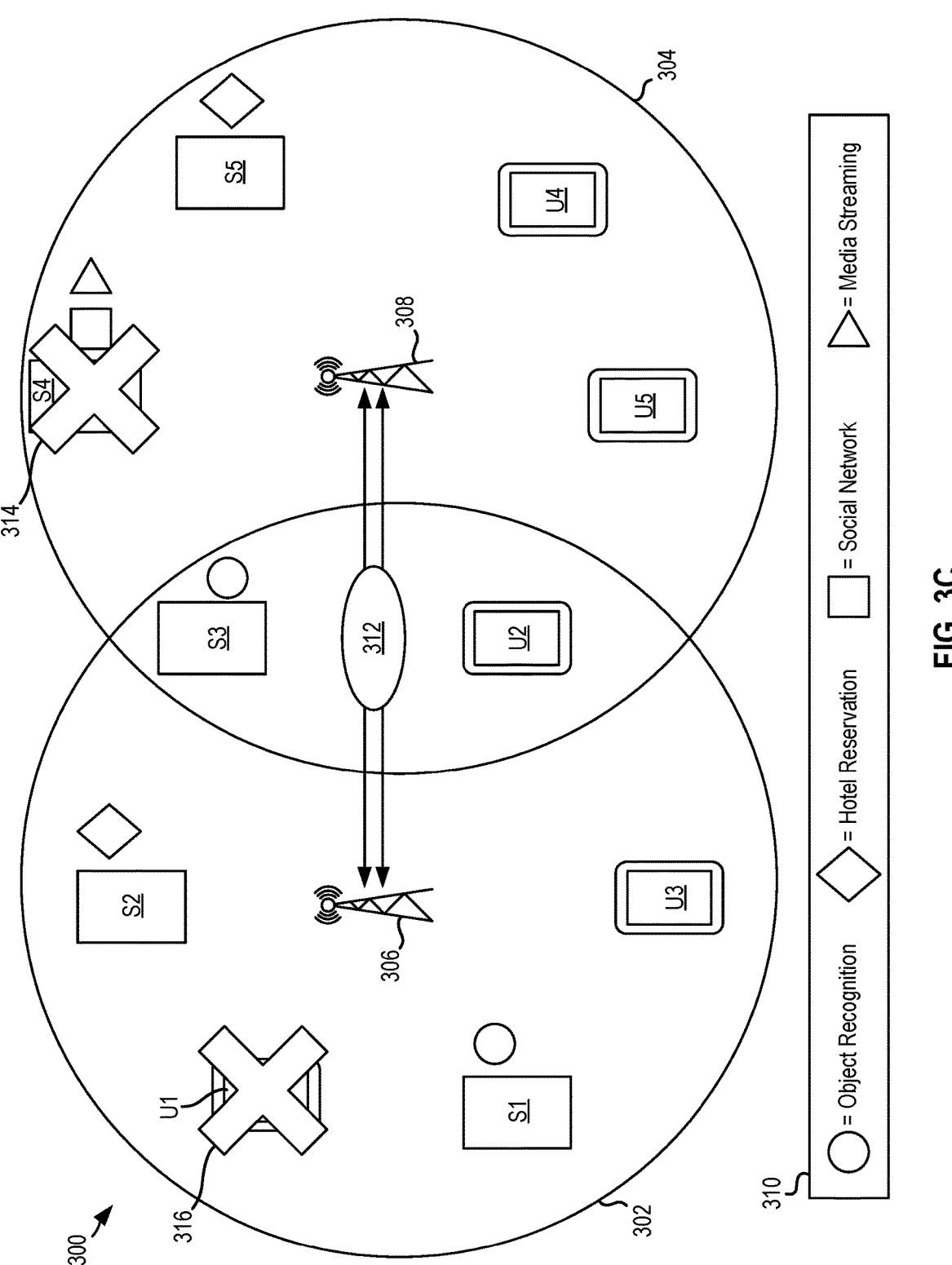

Referring now to FIG. 3B, a first fault 314 is caused to be injected into a first node of the second edge site, e.g., server S2, for causing a first fault injection configuration. In other words, the first fault injection configuration includes all of the nodes of FIG. 3A being functional except server S2. In contrast, referring now to FIG. 3C, a second fault 316 is caused to be injected into a first node of the first edge site, e.g., user device U1, for causing a second fault injection configuration. Note that the resulting second fault injection configuration is also caused by the first fault 314 being injected into first node of the second edge site. Accordingly, the second fault injection configuration includes all of the nodes of FIG. 3A being functional except server S2, and all of the nodes of FIG. 3A being functional except user device U1.

Figure 3D:
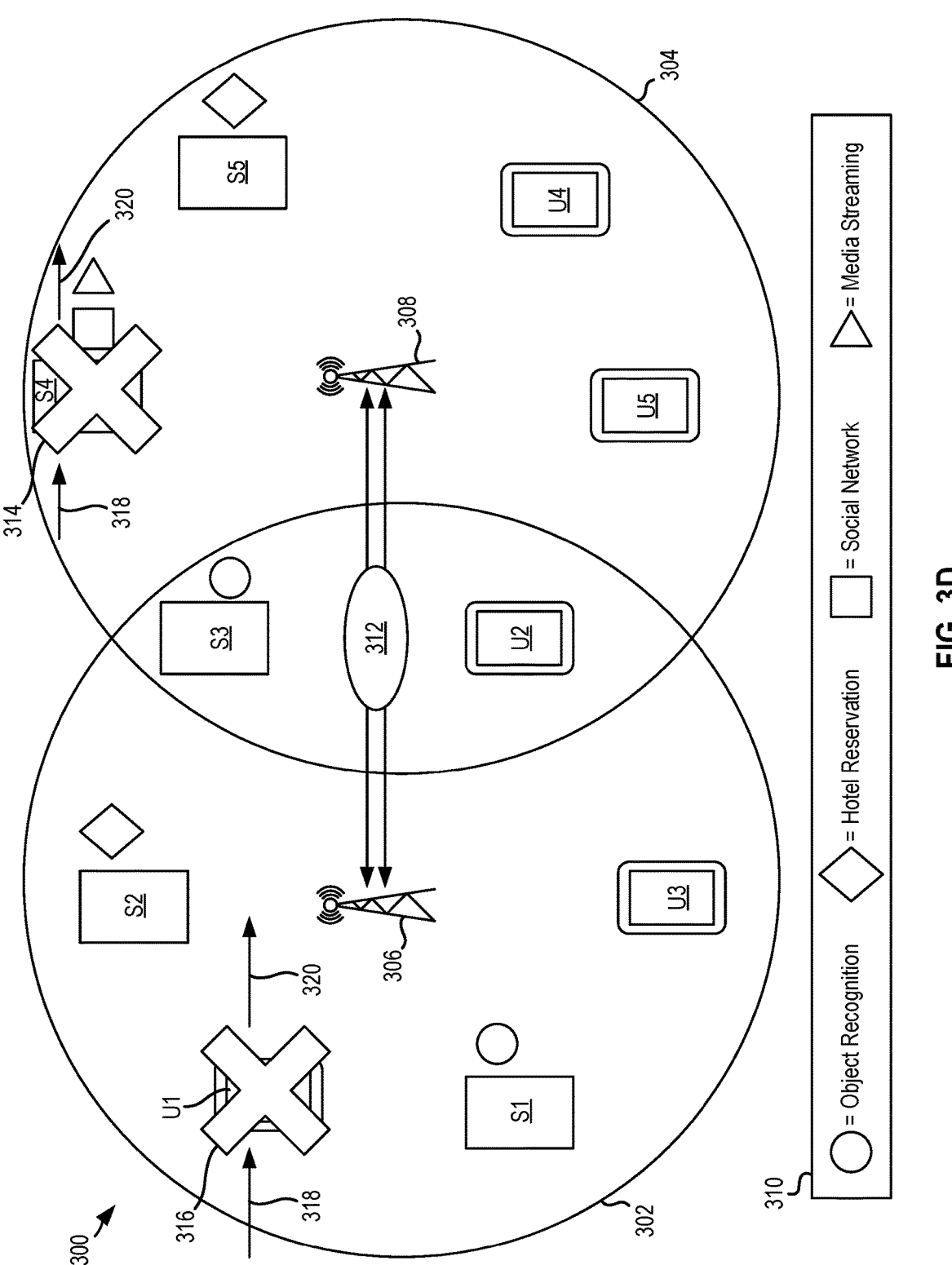

FIG. 3D illustrates the operative techniques described herein for determining which servers to inject fault injection configurations into and which links to inject fault injection configurations into. These techniques include performing the fault injections and then evaluating incoming flows 318 and outgoing flows 320 to determine whether a subset of faults are equivalent.

Figure 4:
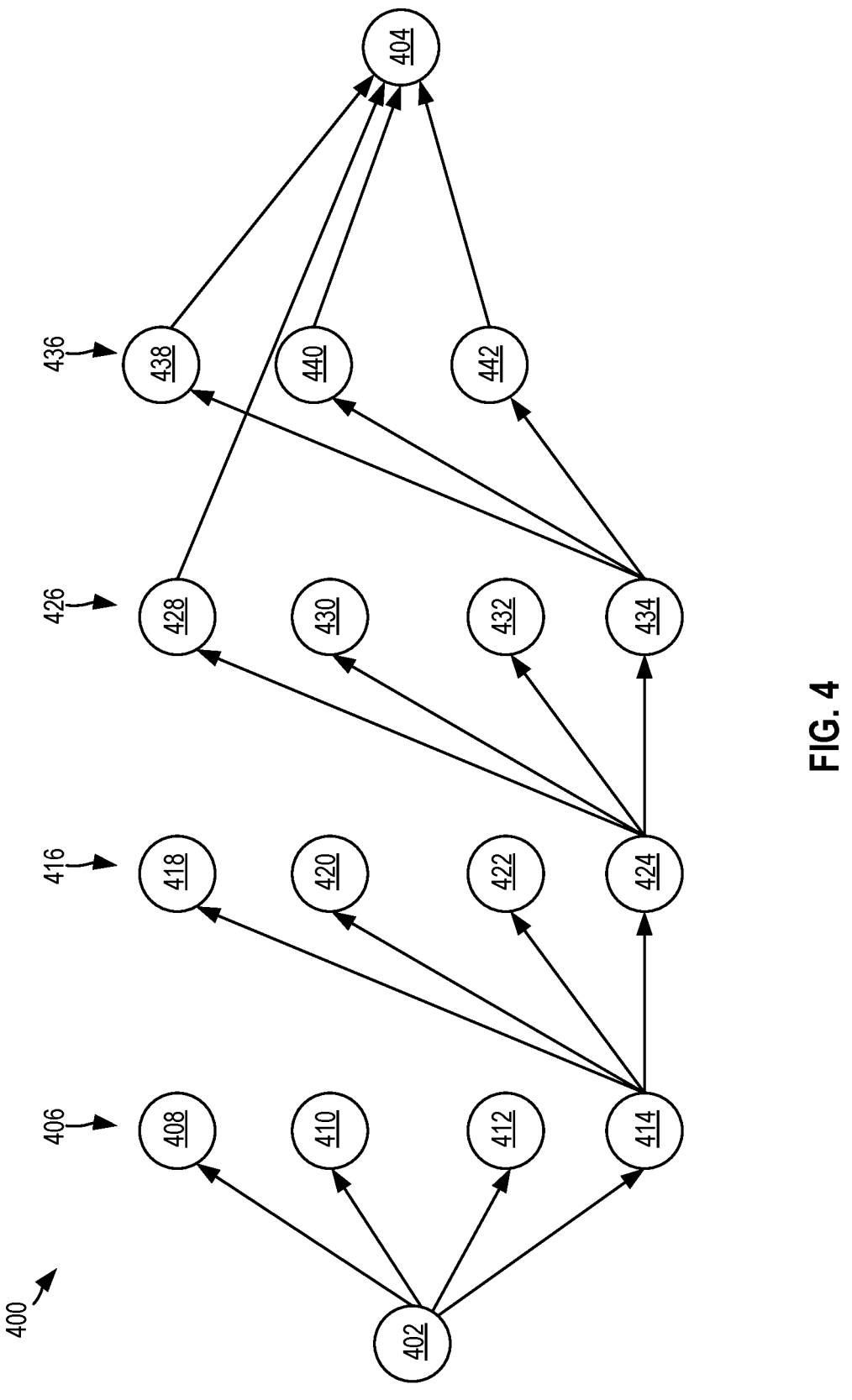
FIG. 4 depicts a flow mapping of edge nodes, in accordance with one embodiment of the present invention.

FIG. 4 depicts a flow mapping 400 of edge nodes, in accordance with one embodiment. As an option, the present flow mapping 400 may be implemented in conjunction with features from any other embodiment listed herein, such as those described with reference to the other FIGS. Of course, however, such flow mapping 400 and others presented herein may be used in various applications and/or in permutations which may or may not be specifically described in the illustrative embodiments listed herein. Further, the flow mapping 400 presented herein may be used in any desired environment.

The flow mapping 400 details flows of loads across nodes of at four edge sites during a fault injection configuration. For example, a first column of nodes 406 illustrates nodes

408-414 of a first edge site, a second column of nodes 416 illustrates nodes 418-424 of a second edge site, a third column of nodes 426 illustrates nodes 428-434 of a third edge site, and a fourth column of nodes 436 illustrates nodes 438-442 of a fourth edge site.

Nodes that have flows that traverses to ("hops to") a sink 404 of the flow mapping 400 indicate nodes that do not route load to nodes of other edge sites, e.g., the end of the respective flows. For example, nodes 428 and 438-442 are shown to flow to the sink 404, although nodes 408-412, 418-422 and 430-432 also flow to the sink 404 but for purposes of brevity do not include arrows to indicate such flow in FIG. 4. In contrast, some nodes have a flow that does not traverse to the sink of the first mapping but instead traverses to another of the nodes in the flow mapping, e.g., see nodes 414, 424 and 434. These nodes are load balancer nodes and indicate the nodes of the edge sites that route load to nodes of the other edge sites at least during the fault injection configuration.

Figure 5:
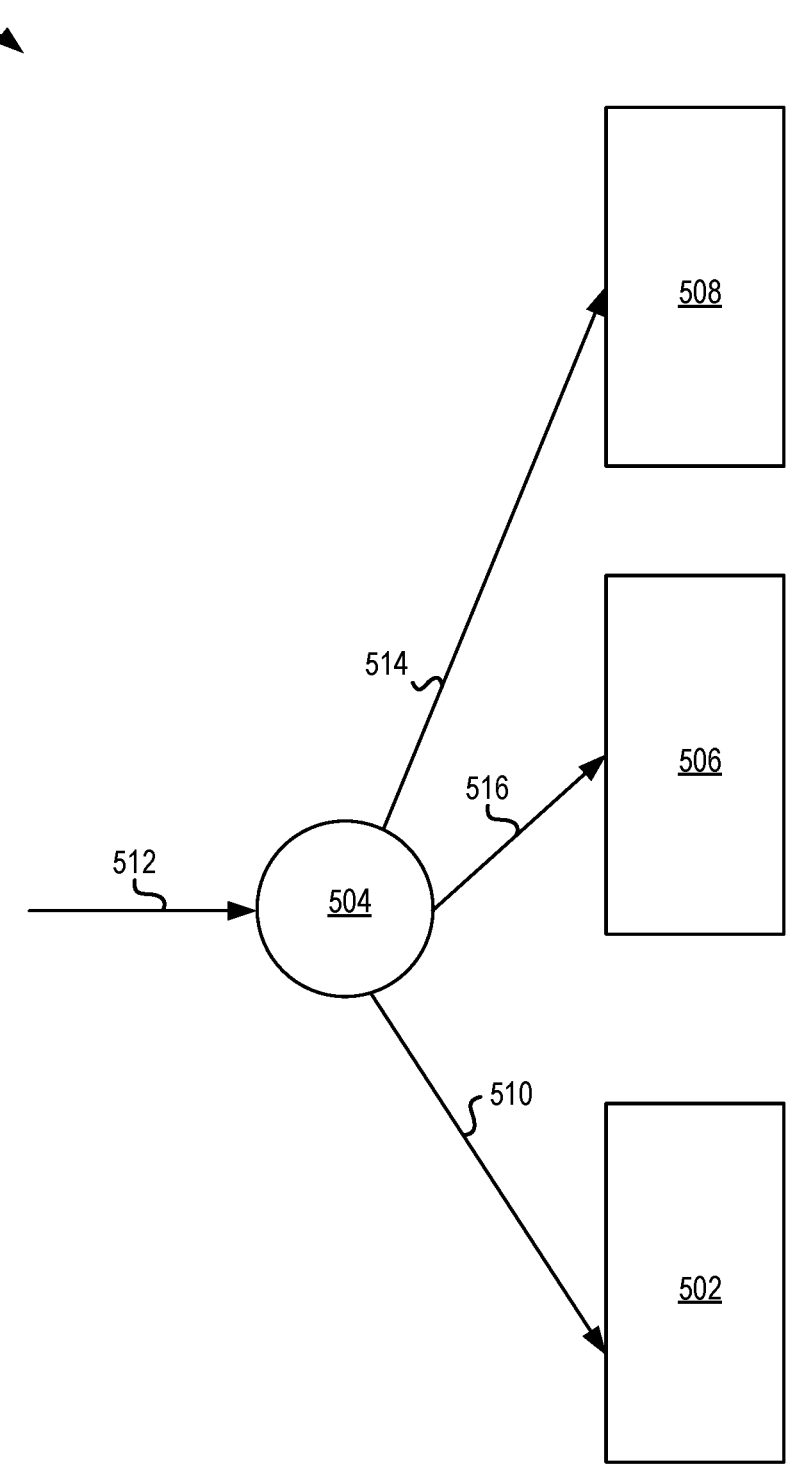
FIG. 5 is a cloud environment, in accordance with one embodiment of the present invention.

FIG. 5 depicts a cloud environment 500, in accordance with one embodiment. As an option, the present cloud environment 500 may be implemented in conjunction with features from any other embodiment listed herein, such as those described with reference to the other FIGS. Of course, however, such cloud environment 500 and others presented herein may be used in various applications and/or in permutations which may or may not be specifically described in the illustrative embodiments listed herein. Further, the cloud environment 500 presented herein may be used in any desired environment.

The cloud environment 500 includes a faulty node that fails as a result of a caused first fault injection configuration. Based on this failure, a portion 510 of an incoming load 512 that is received by a load balancer node 504 that would otherwise be routed to the node 502 must be rerouted to other nodes that are functional, e.g., node 506 and node 508. This may include refactoring a cost to account for the failure, and in doing so increasing the cost of other edges 514 and 516 that route to functional nodes to maintain the same flow throughput of the load balancer node 504.

Techniques for performing this refactoring are described elsewhere herein, e.g., see method 200. These techniques include, for the first fault injection configuration, computing, for each node, incoming edges as "I" and outgoing edges as "O". Furthermore, for fault injected nodes, the load balancer connecting to the fault injected node may be considered, and a minimum cost maximum flow may be computed using the one or more formulas described elsewhere herein. This may increase the cost of all outgoing edges from the load balancer node.

These techniques may additionally include making computations for each fault injection configuration (J) for "N" number of edge sites, e.g., where J=2 . . . . N. in these computations, for each node, the incoming edges are "I" and the outgoing edges are "O". For fault injected nodes, the load balancer connecting to the fault injected node is considered and a minimum cost maximum flow is computed via one or more of the formulas described elsewhere herein using the computational techniques described elsewhere herein. This increases the cost of all outgoing edges from the load balancer. The max flow value that is computed is compared with earlier pairwise, e.g., compared with a previously computed minimum cost maximum flow value. In response to a determination that a difference of the values is less than a predetermined threshold, one of the fault injection configurations is retained for a fault injection testing process.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

causing a first fault injection configuration to be injected into a first node of a first edge site of a cloud environment, wherein the first edge site includes a plurality of nodes including the first node, wherein the cloud environment includes a second edge site;

computing a first minimum cost maximum computational flow value for the first fault injection configuration;

causing a second fault injection configuration to be injected into a second node of the second edge site for causing a second fault injection;

computing a second minimum cost maximum computational flow value for the second fault injection configuration;

in response to a determination that a difference of the first minimum cost maximum computational flow value and the second minimum cost maximum computational flow value is less than a predetermined threshold:

determining that the first fault injection configuration and the second fault injection configuration are equivalent, retaining the first fault injection configuration for a fault injection testing process, and discarding the second fault injection configuration; and performing the fault injection testing process, wherein the performing the fault injection testing process includes:

causing further fault injections within the first edge site and the second edge site, examining and testing recovery and workaround procedures for the further fault injections, and using the recovery and workaround procedures during operation of the cloud environment.

2. The CIM of claim 1, wherein the injection of the first fault injection configuration into the first node causes the first node to at least temporarily fail.

3. The CIM of claim 2, the CIM comprising: determining nodes of the plurality of nodes of the first edge site that remain functional during the first fault injection configuration, wherein the second edge site includes a plurality of nodes including the second node; and determining nodes of the plurality of nodes of the second edge site that remain functional during the second fault injection, wherein a node of the plurality of nodes of the first edge site remaining functional is defined as the node of the plurality of nodes of the first edge site being able to process a first computational load and being able to pass some of the first computational load to a node of the plurality of nodes of the second edge site, wherein a node of the plurality of nodes of the second edge site remaining functional is defined as the node of the plurality of nodes of the second edge site being able to process a second computational load and being able to pass some of the second computational load to a node of the plurality of nodes of the first edge site, wherein the first minimum cost maximum computational flow value and the second minimum cost maximum computational flow value are computed with respect to energy consumed by the nodes of the plurality of nodes of the first edge site that are determined to remain functional and the nodes of the plurality of nodes of the second edge site that are determined to remain functional, wherein the first minimum cost maximum computational flow value is calculated as a relatively lowest cost flow of a relatively highest computational load throughout the nodes of the plurality of nodes of the first edge site that are determined to remain functional, wherein the second minimum cost maximum computational flow value is calculated as a relatively lowest cost flow of a relatively highest computational load throughout the nodes of the plurality of nodes of the second edge site that are determined to remain functional.

4. The CIM of claim 3, the CIM comprising: in response to a determination that the difference of the first minimum cost maximum computational flow value and the second minimum cost maximum computational flow value is greater than the predetermined threshold, retaining the first fault injection configuration and the second fault injection configuration for the fault injection testing process.

5. The CIM of claim 4, wherein retaining the first fault injection configuration for the fault injection testing process and discarding the second fault injection configuration includes adding the first fault injection configuration to a target list for the fault injection testing process; and the CIM comprising: performing the fault injection testing process for fault injection configurations in the target list.

6. The CIM of claim 5, the CIM comprising: generating a first mapping that details flows of computational loads across the plurality of nodes of the first edge site and the node of the second edge site during the first fault injection configuration, wherein a first of the flows hops from the first node on the first edge site to the second node on the second edge site, wherein a second of the flows routes from the second node on the second edge site to a sink of the first mapping; and generating a second mapping that details the flows, including the first flow and the second flow, of computational loads across the plurality of nodes of the first edge site and the node of the second edge site during the second fault injection configuration, wherein a head of the first flow within the first mapping is a representation of the first node on the first edge site based on the first fault injection configuration being injected into the first node of the first edge site, wherein a head of the second flow within the first mapping is a representation of the second node on the second edge site based on the second fault injection configuration being injected into the second node of the second edge site.

7. The CIM of claim 6, wherein representations of node(s) of the second edge site within the first mapping having a flow that traverses to the sink of the first mapping indicate the node(s) of the second edge site that do not route computational loads to node of the first edge site, wherein representations of node(s) of the second edge site within the first mapping having a flow that does not traverse to the sink of the second mapping indicate the node(s) of the second edge site that route computational loads to node of the first edge site.

8. The CIM of claim 7, wherein the nodes of the first edge site and the node of the second edge site are servers or user devices, wherein directions of the flows in the first mapping are illustrated with arrows, wherein a single sink is illustrated in the first mapping, wherein a plurality the arrows route to the single sink in the first mapping, wherein the computational loads are distributed to the plurality of nodes of the first edge site and the plurality of nodes of the first edge site by a load balancing node that first receives the computational loads.

9. A computer program product (CPP), the CPP comprising:

a set of one or more computer-readable storage media; and program instructions, collectively stored in the set of one or more storage media, for causing a processor set to perform the following computer operations:

cause a first fault injection configuration to be injected into a first node of a first edge site of a cloud environment, wherein the first edge site includes a plurality of nodes including the first node, wherein the cloud environment includes a second edge site;

compute a first minimum cost maximum computational flow value for the first fault injection configuration;

cause a second fault injection configuration to be injected into a second node of the second edge site for causing a second fault injection;

compute a second minimum cost maximum computational flow value for the second fault injection configuration;

in response to a determination that a difference of the first minimum cost maximum computational flow value and the second minimum cost maximum computational flow value is less than a predetermined threshold:

determining that the first fault injection configuration and the second fault injection configuration are equivalent, retain the first fault injection configuration for a fault injection testing process, and discard the second fault injection configuration; and perform the fault injection testing process, wherein the performing the fault injection testing process includes:

causing further fault injections within the first edge site and the second edge site, examining and testing recovery and workaround procedures for the further fault injections, and using the recovery and workaround procedures during operation of the cloud environment.

10. The CPP of claim 9, wherein the injection of the first fault injection configuration into the first node causes the first node to at least temporarily fail.

11. The CPP of claim 10, and the CPP comprising: the program instructions, collectively stored in the set of one or more storage media, for causing the processor set to perform the following computer operations: determine nodes of the plurality of nodes of the first edge site that remain functional during the first fault injection configuration, wherein the second edge site includes a plurality of nodes including the second node; and determine nodes of the plurality of nodes of the second edge site that remain functional during the second fault injection, wherein a node of the plurality of nodes of the first edge site remaining functional is defined as the node of the plurality of nodes of the first edge site being able to process a first computational load and being able to pass some of the first computational load to a node of the plurality of nodes of the second edge site, wherein a node of the plurality of nodes of the second edge site remaining functional is defined as the node of the plurality of nodes of the second edge site being able to process a second computational load and being able to pass some of the second computational load to a node of the plurality of nodes of the first edge site, wherein the first minimum cost maximum computational flow value and the second minimum cost maximum computational flow value are computed with respect to energy consumed by the nodes of the plurality of nodes of the first edge site that are determined to remain functional and the nodes of the plurality of nodes of the second edge site that are determined to remain functional, wherein the first minimum cost maximum computational flow value is calculated as a relatively lowest cost flow of a relatively highest computational load throughout the nodes of the plurality of nodes of the first edge site that are determined to remain functional, wherein the second minimum cost maximum computational flow value is calculated as a relatively lowest cost flow of a relatively highest computational load throughout the nodes of the plurality of nodes of the second edge site that are determined to remain functional.

12. The CPP of claim 11, and the CPP comprising: program instructions, collectively stored in the set of one or more storage media, for causing the processor set to perform the following computer operations: in response to a determination that the difference of the first minimum cost maximum computational flow value and the second minimum cost maximum computational flow value is greater than the predetermined threshold, retain the first fault injection configuration and the second fault injection configuration for the fault injection testing process.

13. The CPP of claim 12, wherein retaining the first fault injection configuration for the fault injection testing process and discarding the second fault injection configuration includes adding the first fault injection configuration to a target list for the fault injection testing process; and the CPP comprising: program instructions, collectively stored in the set of one or more storage media, for causing the processor set to perform the following computer operations: perform the fault injection testing process for fault injection configuration in the target list.

14. The CPP of claim 13, the CPP comprising: program instructions, collectively stored in the set of one or more storage media, for causing the processor set to perform the following computer operations: generate a first mapping that details flows of computational loads across the plurality of nodes of the first edge site and the node of the second edge site during the first fault injection configuration, wherein a first of the flows hops from the first node on the first edge site to the second node on the second edge site, wherein a second of the flows routes from the second node on the second edge site to a sink of the first mapping; and generate a second mapping that details the flows, including the first flow and the second flow, of computational loads across the plurality of nodes of the first edge site and the node of the second edge site during the second fault injection configuration, wherein a head of the first flow within the first mapping is a representation of the first node on the first edge site based on the first fault injection configuration being injected into the first node of the first edge site, wherein a head of the second flow within the first mapping is a representation of the second node on the second edge site based on the second fault injection configuration being injected into the second node of the second edge site.

15. The CPP of claim 14, wherein representations of node(s) of the first second edge site within the first mapping having a flow that traverses to the sink of the first mapping indicate the node(s) of the second edge site that do not route computational loads to node of the first edge site, wherein representations of node(s) of the second edge site within the first mapping having a flow that does not traverse to the sink of the second mapping indicate the node(s) of the second edge site that route computational loads to node of the first edge site.

16. The CPP of claim 15, wherein the nodes of the first edge site and the node of the second edge site are servers or user devices, wherein directions of the flows in the first mapping are illustrated with arrows, wherein a single sink is illustrated in the first mapping, wherein a plurality the arrows route to the single sink in the first mapping, wherein the computational loads are distributed to the plurality of nodes of the first edge site and the plurality of nodes of the first edge site by a load balancing node that first receives the computational loads.

17. A computer system (CS), the CS comprising:

a processor set;

a set of one or more computer-readable storage media;

program instructions, collectively stored in the set of one or more storage media, for causing the processor set to perform the following computer operations:

cause a first fault injection configuration to be injected into a first node of a first edge site of a cloud environment, wherein the first edge site includes a plurality of nodes including the first node, wherein the cloud environment includes a second edge site;

compute a first minimum cost maximum computational flow value for the first fault injection configuration;

cause a second fault injection configuration to be injected into a second node of the second edge site for causing a second fault injection;

compute a second minimum cost maximum computational flow value for the second fault injection configuration;

in response to a determination that a difference of the first minimum cost maximum computational flow value and the second minimum cost maximum computational flow value is less than a predetermined threshold;

determining that the first fault injection configuration and the second fault injection configuration are equivalent, retain the first fault injection configuration for a fault injection testing process, and discard the second fault injection configuration; and perform the fault injection testing process, wherein the performing the fault injection testing process includes:

causing further fault injections within the first edge site and the second edge site, examining and testing recovery and workaround procedures for the further fault injections, and using the recovery and workaround procedures during operation of the cloud environment.

18. The CS of claim 17, wherein the injection of the first fault injection configuration into the first node causes the first node to at least temporarily fail.

19. The CS of claim 18, the CS comprising: program instructions, collectively stored in the set of one or more storage media, for causing the processor set to perform the following computer operations: determine nodes of the plurality of nodes of the first edge site that remain functional during the first fault injection configuration, wherein the second edge site includes a plurality of nodes including the second node; and determine nodes of the plurality of nodes of the second edge site that remain functional during the second fault injection, wherein a node of the plurality of nodes of the first edge site remaining functional is defined as the node of the plurality of nodes of the first edge site being able to process a first computational load and being able to pass some of the first computational load to a node of the plurality of nodes of the second edge site, wherein a node of the plurality of nodes of the second edge site remaining functional is defined as the node of the plurality of nodes of the second edge site being able to process a second computational load and being able to pass some of the second computational load to a node of the plurality of nodes of the first edge site, wherein the first minimum cost maximum computational flow value and the second minimum cost maximum computational flow value are computed with respect to energy consumed by the nodes of the plurality of nodes of the first edge site that are determined to remain functional and the nodes of the plurality of nodes of the second edge site that are determined to remain functional, wherein the first minimum cost maximum computational flow value is calculated as a relatively lowest cost flow of a relatively highest computational load throughout the nodes of the plurality of nodes of the first edge site that are determined to remain functional, wherein the second minimum cost maximum computational flow value is calculated as a relatively lowest cost flow of a relatively highest computational load throughout the nodes of the plurality of nodes of the second edge site that are determined to remain functional.

20. The CS of claim 19, the CS comprising: program instructions, collectively stored in the set of one or more storage media, for causing the processor set to perform the following computer operations: in response to a determination that the difference of the first minimum cost maximum computational flow value and the second minimum cost maximum computational flow value is greater than the predetermined threshold, retaining the first fault injection configuration and the second fault injection configuration for the fault injection testing process.

\* \* \* \* \*